Oct. 11, 1949.  M. T. MOORE  2,484,421
ELECTRIC ARC WELDING APPARATUS
Original Filed Jan. 10, 1944  2 Sheets-Sheet 1
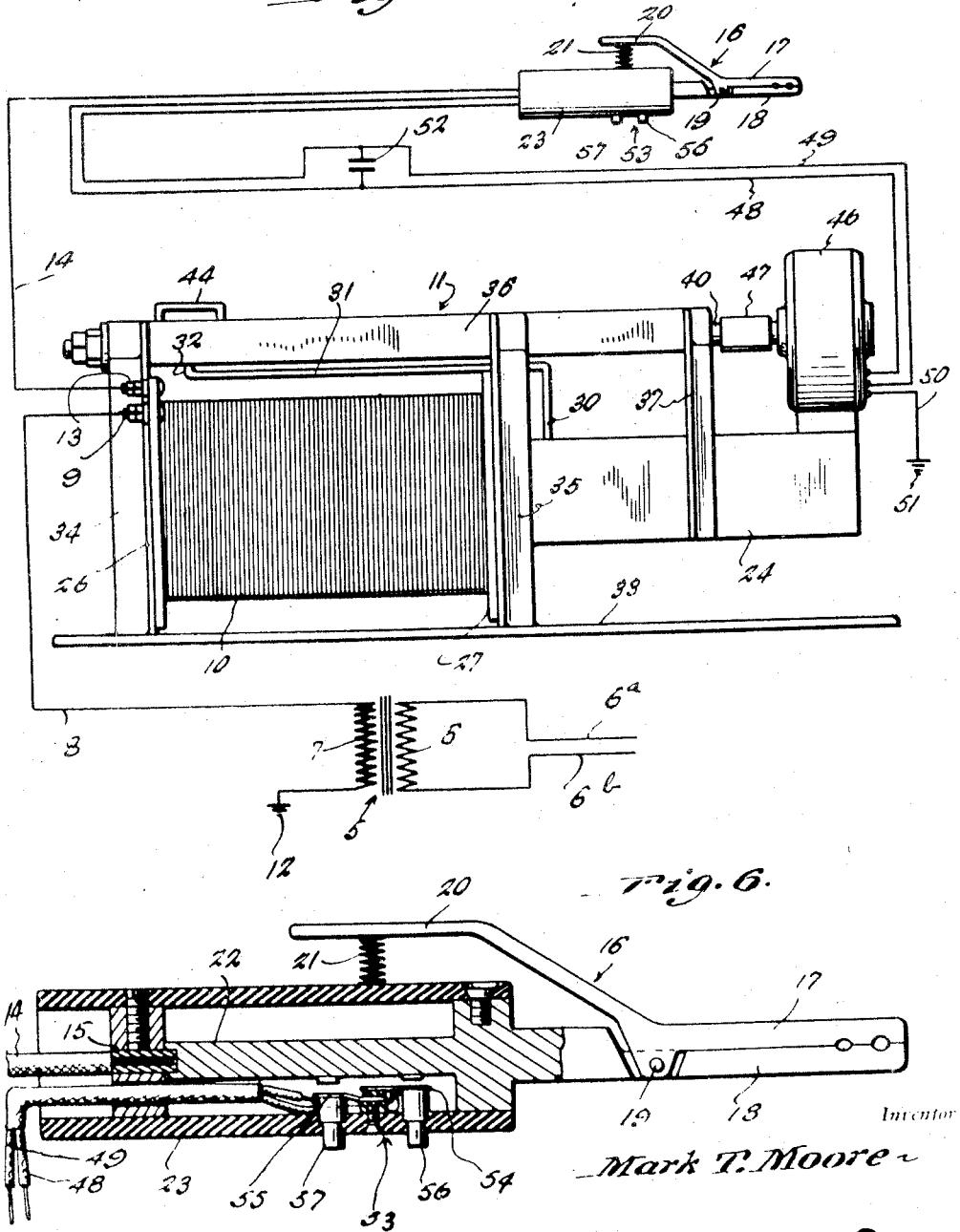
Inventor
Mark T. Moore

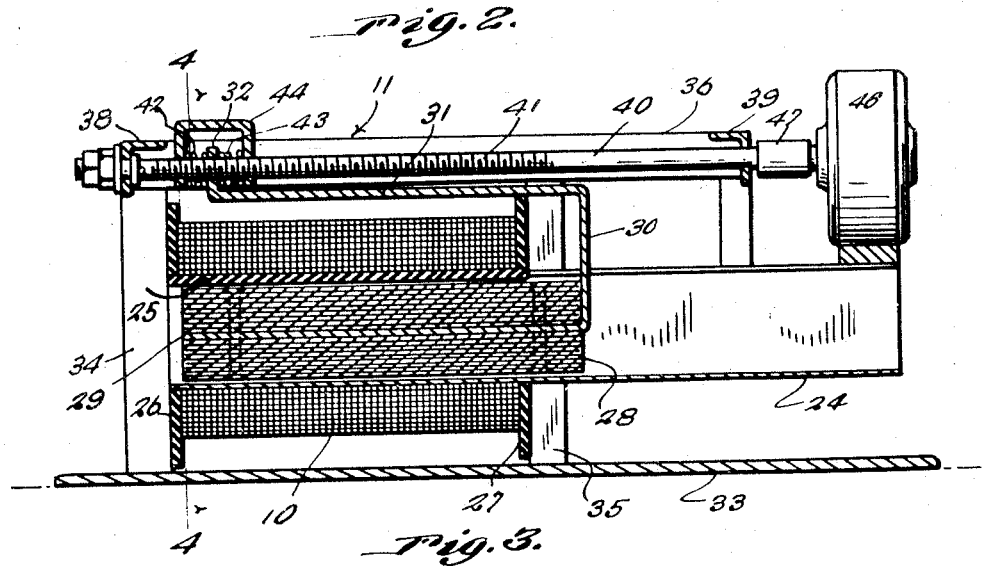
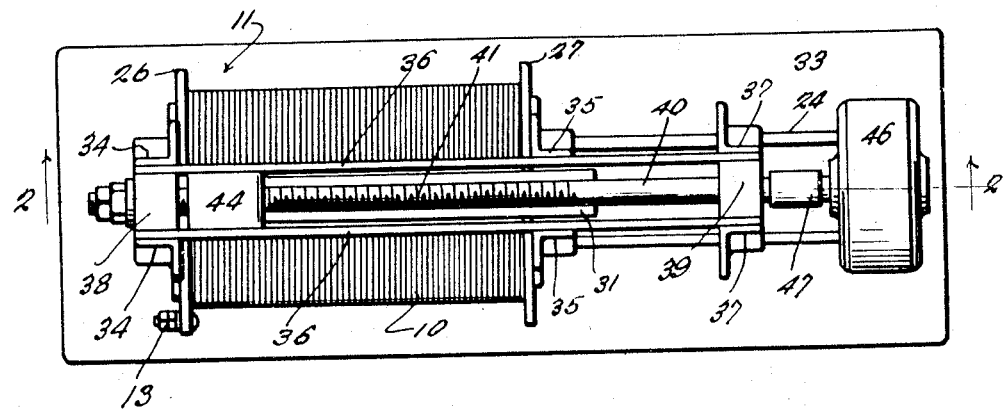
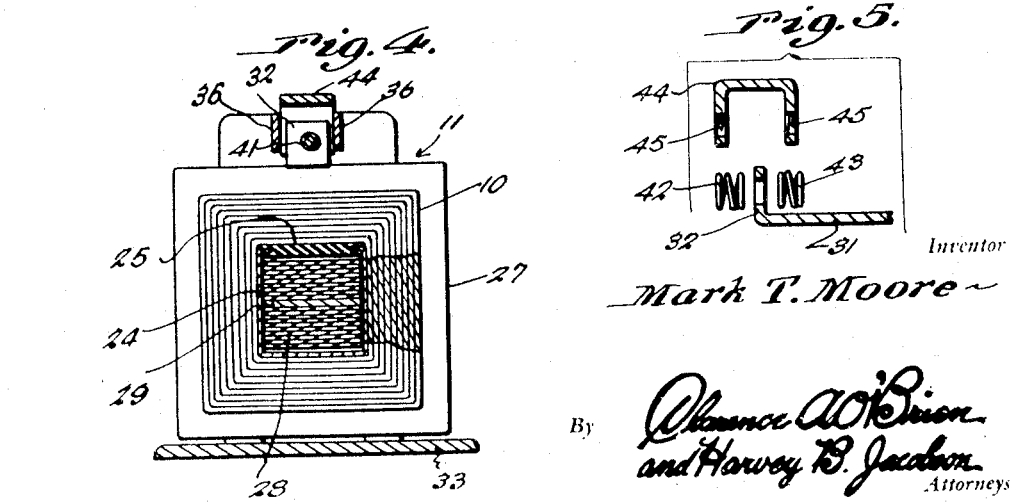

Patented Oct. 11, 1949

2,484,421

UNITED STATES PATENT OFFICE 2,484,421

ELECTRIC ARC WELDING APPARATUS

Mark T. Moore, Kearney, Nebr.

Continuation of application Serial No. 517,700, January 10, 1944. This application July 12, 1945, Serial No. 604,592

1 Claim. (Cl. 171—242)

This application is a continuation of my U. S. application upon arc welding apparatus, filed January 10, 1944, Serial No. 517,700, and now abandoned.

This invention relates to electric arc welding apparatus, and has more particular reference to an improved device for adjusting the core of the inductive reactance, forming part of the apparatus, relative to the coil of said inductive reactance, and to thereby regulate the amperage of the welding current supplied to the electrode holder of the welding apparatus.

The primary object of the present invention is to provide a core-adjusting means of the above kind which is controllable from the electrode holder at a point remote from the rest of the welding apparatus, thereby permitting the operator to control the amperage of the welding current supplied to the electrode holder, without returning to the point where the rest of the welding apparatus is located. This permits the operator to weld delicate work requiring low amperage by readily and conveniently reducing the amperage after the arc is struck, and makes it practical for the operator to work with an amperage so low that it would be impossible to strike an arc with the ordinary A. C. welder unless the operator returned to the point where the rest of the welding apparatus is located and manually adjusted the core of the inductive reactance.

In a preferred embodiment of the invention, the core of the inductive reactance is adjusted by the use of a rotatable adjusting screw operated by a reversible motor, the operation and direction of rotation of the motor being controlled by a two-way switch carried by the electrode holder of the welding apparatus.

An important object of the present invention is to provide an operating motor for the core-adjusting screw which derives its current from the feed side of the secondary of the transformer of the welding apparatus, the motor having two feed wires to which the current is selectively supplied, depending upon the direction of rotation desired for the motor, and the two-way switch carried by the electrode holder being adapted to selectively connect either desired feed wire of the motor with the feed side of said transformer secondary.

Specific objects and features of the present invention will become apparent from the following description, when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a view, partly in side elevation, and partly diagrammatic, illustrating an embodiment of the present invention operatively associated with elements of an A. C. electric arc welding apparatus.

Figure 2 is a substantially central longitudinal vertical sectional view of the inductive reactance forming part of the construction shown in Figure 1, and revealing details of construction of the core-adjusting means for said inductive reactance, the view being taken substantially on the plane of line 2—2 of Figure 3.

Figure 3 is a top plan view of the construction shown in Figure 2.

Figure 4 is a vertical transverse section taken on line 4—4 of Figure 2, with the coil partly broken away in section.

Figure 5 is a developed view in fragmentary vertical section, showing the parts for operatively connecting the operating bar of the adjustable core with the adjusting screw.

Figure 6 is an enlarged view of the electrode holder forming part of the construction shown in Figure 1, said electrode holder being partly in side elevation and partly in longitudinal section to reveal the construction of the two-way switch for controlling the operation and direction of rotation of the driving motor for the core-adjusting screw.

Referring in detail to the drawings, the present invention is particularly designed for use in connection with an A. C. electric arc welding apparatus employing a transformer 5 whose primary winding 6 has leads 6a and 6b for connection with power lines, and whose secondary winding 7 has its feed side connected by wire 8 with a binding post 9 to which is connected one end of the coil or winding 10 of an inductive reactance 11, the other side of the secondary coil or winding 7 being grounded, as at 12. Also, the other end of the winding or coil 10 of the inductive reactance 11 is connected to a further binding post 13 which is in turn connected by a wire 14 with the feed terminal 15 of an electrode holder 16. As shown, the electrode holder 16 preferably consists of a pair of electrode-gripping jaws 17 and 18, the jaw 17 being pivoted to the jaw 18, as at 19, and being provided with a finger piece 20 operable for releasing the electrode against the action of a spring 21 which normally swings the jaw 17 toward the jaw 18 for gripping engagement with the electrode. Also, the jaw 18 has an integral conducting member 22 on its inner end which carries the terminal 15 and is enclosed within a tubular insulating handle 23.

The inductive reactance 11 has its coil 10 wound upon an iron tube 24 which is divided longitudinally at the top to receive a fiber or other insulating insert 25. The tube 24 is received in central openings of spaced heads 26 and 27 of insulating material, and the channel-shaped iron member of the tube 24 projects beyond the head 27 to form an extended guide for the laminated iron core 28 which is slidably fitted in said tube 24 for adjustment inwardly or outwardly of the coil 10. The core 28 has a central longitudinal bar 29 provided at one end with an upward extension 30 projecting upwardly through the tube 24 and then horizontally over the coil 10, as at 31. The horizontal portion 31 of bar 29 terminates in an upwardly directed ear 32.

The coil 10 is mounted upon a suitable base plate 33 from which rises spaced pairs of posts 34 and 35 disposed at opposite ends of the coil 10, the posts 35 being disposed at opposite sides of the tube 24. The posts 34 and 35 are connected by a pair of spaced horizontal guide strips 36 extending longitudinally of and over the coil 10 and projecting beyond the posts 35 where they are additionally supported by further posts 37 secured to opposite sides of the extended portion of tube 24. The upper ends of posts 34 and 37 are respectively connected by spacers or bridge pieces 38 and 39 in which is journaled a horizontal adjusting screw 40 disposed longitudinally of the coil 10 above the latter, and having a threaded major intermediate portion 41. The screw 40 extends freely through the aperture of the ear 32 and is encircled at opposite sides of said ear 32 by relatively short compression springs 42 and 43. A yoke-shaped nut member 44 has threaded apertures 45 in the legs thereof which threadedly receive the threaded portion 41 of screw 40, and this nut member straddles the ear 32 so that the springs 42 and 43 are interposed between the ear 32 and the respective legs of said nut member 44. Thus, a slight yielding connection is provided between the operating bar 29 of the core and the nut member 44 which is caused to have horizontal reciprocating motion between the guide strips 36 by operation of the screw 40. It is to be understood that the nut member 44 is fitted between the guide strips 36 so as to be held or restrained against turning by the latter, thereby enabling the nut member 44 to be moved horizontally when the screw 40 is rotated. Due to the connection of nut member 44 with bar 29, the adjustment of nut member 44 will cause corresponding adjustment of the core 28 into or out of the coil 10, depending upon the direction in which the screw 40 is rotated.

As shown clearly in Figures 1 to 3, inclusive, a reversible electric motor 46 is mounted upon the extended end of tube 24 and has its armature shaft coupled at 47 to the adjacent end of adjusting screw 40 for driving the latter. Motor 46 has two feed wires 48 and 49 so that when current is fed to the motor through wire 48, said motor will be driven in one direction, while when current is fed to the motor through the other wire 49, said motor will be driven in the opposite direction. The return wire of motor 46 is indicated at 50 and is grounded at 51. Motor 46 is known as a two-phase consequent capacitator wound for the voltage of the secondary 7 of the transformer 5, a capacitor 52 being provided in association with the wires 48 and 49 to facilitate starting of the motor.

A two-way switch is carried by the handle 23 of the electrode holder 16, as generally indicated at 53. This switch includes a contact 54 to which wire 48 is connected and a contact 55 to which wire 49 is connected, said contacts respectively being provided with operating push buttons 56 and 57. The contacts 54 and 55 are selectively engageable with the conducting member 22 of the electrode holder jaw 18 so that current for operating motor 46 may be derived from the feed side of the secondary 7 of transformer 5 by engaging the desired contact 54 or 55 with said conducting member 22. The arrangement is such that when contact 54 is engaged with conducting member 22, current is supplied to motor 46 by way of wire 48 so as to cause motor 46 to be operated in one direction. On the other hand, when contact 55 is engaged with conductor member 22, current is derived from the latter and supplied to motor 46 by way of wire 49 so as to drive the motor 46 in the opposite direction. It will, of course, be understood that the work being welded is grounded for the return of the welding current to the secondary 7 by way of its ground 12. It is also well known that the inductive reactance 11 and transformer 5 are located in a casing and remain at a point quite remote from the point where the electrode holder 16 is used for operating upon the work. Thus, it is not practical or convenient for the operator using the electrode holder to return to the rest of the apparatus whenever adjustment of the core 28 is desired. With the present invention, the operator need only operate the desired contact 54 or 55 to effect the desired adjustment of core 28, operation or closing of one contact effecting operation of the motor in the opposite direction for causing movement of the core into the coil. In this way, the motor-driven core-adjusting device is controlled by the operator at the electrode holder so that he may readily control the amperage of the welding current without returning to the rest of the welding apparatus where the inductive reactance is located. This permits the operator to weld delicate work requiring low amperage by reducing the amperage quickly and easily after the arc is struck. Accordingly, the operator may work with an amperage so low that it would be impractical to readily strike an arc with the ordinary A. C. welding apparatus.

From the foregoing description, it is believed that the construction and operation, as well as the advantages, of the present invention will be readily understood and appreciated by those skilled in the art. The construction is simple and compact, as well as efficient in operation, and it provides a desirable addition to ordinary welding apparatus so as to widen and increase the field of usefulness of such apparatus in accordance with the stated objects of the invention. It is to be understood that changes in features and details of construction illustrated and described are contemplated, such as fairly fall within the spirit and scope of the invention as claimed.

What I claim as new is:

In an A. C. electric arc welding apparatus, in combination, an inductive reactance having a coil and a core adjustable into or out of the coil, a transformer having one side of its secondary connected to one end of said coil and the other side thereof grounded, a conducting member connected to the other end of said coil, means operable for adjusting said core into or out of said coil to vary the amperage of the current delivered from said reactance to said conducting member, a reversible rotary electric motor for actuating said adjusting means, and a normally open two-way switch manually operable for causing operation of said motor in the desired direction from a point remote to the inductive reactance, said motor being grounded at one side and having a feed wire to be supplied with current for operating the motor in one direction and a second feed wire to be supplied with current for operating the motor in the opposite direction, said two-way switch having two contacts each connected to a different one of feed wires and selectively engageable with said conducting member to derive the operating current for the motor from the secondary of the transformer by way of the coil of the reactance.

MARK T. MOORE.

REFERENCES CITED

The following references are of record in the file of this patent:

UNITED STATES PATENTS

| Number | Name | Date |
| --- | --- | --- |
| 1,716,553 | Higbee | June 11, 1929 |
| 1,948,377 | Hacker | Feb. 20, 1934 |
| 2,042,020 | Roe | May 26, 1936 |
| 2,086,316 | Holslag | July 6, 1936 |
| 2,133,919 | Fries | Oct. 18, 1938 |
| 2,217,984 | Kirk | Oct. 15, 1940 |
| 2,260,985 | Benton | Oct. 28, 1941 |
| 2,305,206 | Strobel | Dec. 15, 1942 |